(12) United States Patent
Waltermann (10) Patent No.: US 11,698,302 B2
(45) Date of Patent: Jul. 11, 2023

(54) APPARATUS FOR OPTICAL APPLICATIONS, SPECTROMETER SYSTEM AND METHOD FOR PRODUCING AN APPARATUS FOR OPTICAL APPLICATIONS

(71) Applicant: FiSens GmbH, Braunschweig (DE)

(72) Inventor: Christian Waltermann, Goslar (DE)

(73) Assignee: FiSens GmbH, Braunschweig (DE)

( * ) Notice: Subject to any disclaimer, the term of this patent is extended or adjusted under 35 U.S.C. 154(b) by 171 days.

(21) Appl. No.: 17/188,816

(22) Filed: Mar. 1, 2021

(65) Prior Publication Data

US 2021/0181021 A1 Jun. 17, 2021

Related U.S. Application Data

(63) Continuation of application No. 16/486,987, filed as application No. PCT/EP2018/054170 on Feb. 20, 2018, now Pat. No. 10,962,415.

(30) Foreign Application Priority Data

Feb. 21, 2017 (DE) ...................... 10 2017 202 760.6

(51) Int. Cl.
*G01J 3/18* (2006.01)
*G01D 5/353* (2006.01)
(Continued)

(52) U.S. Cl.
CPC ........ *G01J 3/1895* (2013.01); *G01D 5/35316* (2013.01); *G01J 3/0218* (2013.01);
(Continued)

(58) Field of Classification Search
CPC .. G02B 6/02085; G01J 3/0218; G01J 3/1895; G01D 5/35316
See application file for complete search history.

(56) References Cited

U.S. PATENT DOCUMENTS

| 5,101,458 A | 3/1992 | Spaulding et al. |
| 5,132,843 A | 7/1992 | Aoyama et al. |

(Continued)

FOREIGN PATENT DOCUMENTS

| DE | 19708462 A1 * | 8/1998 | ............ G01J 3/1809 |
| DE | 102014211918 A1 | 12/2015 | |

(Continued)

OTHER PUBLICATIONS

Jean Dahdah, "Nanocoaxial Waveguide Grating as Quarter-Wave Plates in the Visible Range", Oct. 18, 2011 (Year: 2011).*

(Continued)

*Primary Examiner* — Maurice C Smith
(74) *Attorney, Agent, or Firm* — Wolf, Greenfield & Sacks, P.C.

(57) ABSTRACT

The present invention relates to an apparatus for optical applications, a spectrometer system and method for producing an apparatus for optical applications, and in particular to an apparatus comprising an optical waveguide having a first refractive index along a light propagation axis interrupted by a plurality of scattering portions having a second refractive index. Each scattering portion has a long axis substantially perpendicular to the light propagation axis as well as a short axis substantially perpendicular to the light propagation axis and the long axis. A receiver unit or a transmitter unit is arranged on a side of the optical waveguide, the long axis being substantially perpendicular, i.e. normal to the plane of this side on which the receiver unit or transmitter unit is arranged. Accordingly, simplification and miniaturization of an optical apparatus can be realized.

18 Claims, 6 Drawing Sheets

(51) Int. Cl.
 G01J 3/02 (2006.01)
 G02B 6/02 (2006.01)
 G02B 6/42 (2006.01)
(52) U.S. Cl.
 CPC ..... *G02B 6/02085* (2013.01); *G02B 6/02147* (2013.01); *G02B 6/4215* (2013.01)

(56) References Cited

U.S. PATENT DOCUMENTS

| | | | |
|---|---|---|---|
| 5,307,437 | A | 4/1994 | Facq et al. |
| 5,412,746 | A | 5/1995 | Rossberg et al. |
| 5,442,439 | A | 8/1995 | Battey et al. |
| 5,848,204 | A | 12/1998 | Wanser |
| 5,982,962 | A | 11/1999 | Koops et al. |
| 6,016,375 | A | 1/2000 | Hill et al. |
| 6,321,001 | B1 | 11/2001 | Heflinger |
| 6,917,735 | B2 | 7/2005 | Murgatroyd et al. |
| 7,245,795 | B2 | 7/2007 | Walker et al. |
| 7,330,614 | B1 | 2/2008 | Mossberg et al. |
| 7,587,110 | B2 | 9/2009 | Singh et al. |
| RE43,937 | E | 1/2013 | Egalon |
| 2002/0071646 | A1 | 6/2002 | Eggleton et al. |
| 2003/0035624 | A1 | 2/2003 | Saito et al. |
| 2004/0161198 | A1 | 8/2004 | Williams |
| 2004/0234218 | A1 | 11/2004 | Tao et al. |
| 2006/0013527 | A1 | 1/2006 | Morel et al. |
| 2006/0067617 | A1 | 3/2006 | Gaylord et al. |
| 2007/0230861 | A1 | 10/2007 | Khrushchev et al. |
| 2008/0069560 | A1 | 3/2008 | Tissot et al. |
| 2008/0272311 | A1 | 11/2008 | Egalon |
| 2010/0265504 | A1 | 10/2010 | Kopp et al. |
| 2011/0135313 | A1 | 6/2011 | Sun et al. |
| 2014/0053654 | A1 | 2/2014 | Rogge et al. |
| 2020/0018647 | A1 | 1/2020 | Waltermann et al. |

FOREIGN PATENT DOCUMENTS

| | | |
|---|---|---|
| DE | 102015205699 A1 | 10/2016 |
| EP | 0435194 A2 | 7/1991 |
| EP | 0840150 A2 | 5/1998 |
| EP | 0970395 B1 | 10/2001 |
| EP | 1381090 A1 | 1/2004 |
| EP | 1677131 A1 | 10/2011 |
| JP | H04-298703 A | 10/1992 |
| JP | H06-310751 A | 11/1994 |
| JP | 2010-522330 A | 7/2010 |
| JP | 5766403 B2 | 8/2015 |
| WO | WO 98/44366 A1 | 10/1998 |
| WO | WO 2001/02885 A1 | 1/2001 |
| WO | WO 2002/072488 A2 | 9/2002 |
| WO | WO 2006/019598 A2 | 2/2006 |
| WO | WO 2006/116590 A1 | 11/2006 |
| WO | WO 2008/118541 A | 10/2008 |
| WO | WO 2011/044618 A1 | 4/2011 |
| WO | WO 2011/154701 A1 | 12/2011 |
| WO | WO 2014/174256 A1 | 10/2014 |

OTHER PUBLICATIONS

Joshua F. Einsle, "Optical Properties of Annular Aperture Arrays in Plasmonic Thin Films", 2011 (Year: 2011).*
Guang-Huim, "Extraordinary Transmission through Elliptical Gold Nanowire Grating under s-polarization Excitation", 2006 IEEE (Year: 2006).*
International Preliminary Report on Patentability for International Application No. PCT/EP2018/054170 dated Aug. 27, 2019.
International Search Report and Written Opinion for International Application No. PCT/EP2018/054170 dated May 3, 2018.
Åslund et al., Optical loss mechanisms in femtosecond laser-written point-by-point fibre Bragg gratings. Optics express. Sep. 1, 2008;16(18):14248-54.
Bigue, Development of a novel serially multiplexed fiber Bragg grating sensor system using Fourier analysis. University of Toronto Institute for Aerospace Studies; 1997. 170 pages.
Hill et al., Fiber Bragg grating technology fundamentals and overview. Journal of lightwave technology. Aug. 1997;15(8):1263-76.
Malo et al., Single-excimer-pulse writing of fiber gratings by use of a zero-order nulled phase mask: grating spectral response and visualization of index perturbations. Optics Letters. Aug. 1, 1993;18(15):1277-9.
Williams et al., Point-by-point inscription of apodized fiber Bragg gratings. Optics letters. Aug. 1, 2011;36(15):2988-90.
Extended European Search Report dated Jul. 13, 2021 in connection with European Application No. 21172451.3.

* cited by examiner

APPARATUS FOR OPTICAL APPLICATIONS, SPECTROMETER SYSTEM AND METHOD FOR PRODUCING AN APPARATUS FOR OPTICAL APPLICATIONS

CROSS REFERENCE TO RELATED APPLICATIONS

This Application claims the benefit under 35 U.S.C. § 120 as a continuation of U.S. application Ser. No. 16/486,987, filed Aug. 19, 2019, which is a national stage filing under 35 U.S.C. § 371 of International Patent Application Serial No. PCT/EP2018/054170, filed Feb. 20, 2018, which claims priority to German application number 10 2017 202 760.6, filed Feb. 21, 2017. The entire contents of these applications are incorporated herein by reference in their entirety.

FIELD OF THE INVENTION

The present invention relates to an apparatus for optical applications, a spectrometer system and method for producing an apparatus for optical applications, and in particular to an apparatus comprising an optical waveguide having a first refractive index along a light propagation axis interrupted by a plurality of portions having a second refractive index.

BACKGROUND

Optical Bragg gratings, such as a Fiber Bragg Grating (FBG), are well known. A FBG is a type of distributed Bragg reflector in an optical fiber that reflects selected wavelengths of light and transmits others. The Bragg grating is constituted by a periodic variation in the refractive index of the fiber core generating a wavelength-specific dielectric mirror due to selected interferences. A FBG can thus act as an optical filter to block/reflect certain wavelengths. The Bragg grating formed in a fiber occupies commonly a small segment of the fiber having a length in the range of one millimeter to several centimeters.

Optical Bragg gratings may also be used to couple out light of a specific wavelength from the waveguide, wherein in such gratings the variation of the refractive index along the optical axis of the waveguide, for example an optical fiber, is not uniform across the width of the fiber but the variation of the refractive index is at an angle between the optical axis and an axis perpendicular thereto. Thus, such gratings are called tilted fiber Bragg gratings. The angle of tilt has to be chosen sufficiently large so that the light with a wavelength fulfilling the Bragg condition can escape the waveguide. Further, the reflection is polarization dependent so that only the light linearly polarized in the plane of the grating is reflected. Accordingly, such a grating is wavelength and polarization selective.

Dispersive scattering of light on gratings is also known but usually undesired, since it leads to an attenuation of the light traveling through the waveguide. Particularly strong losses due to diffractive scattering can be observed for Type II gratings, written by high intensity UV lasers or femtosecond lasers, both operating above the damage threshold of glass. For example, a femtosecond laser may be used to write a grating point-by-point with pulse energy of approximately 0.1 pJ or more and pulse duration of approximately 100 fs.

By studying the scattering of gratings in more detail the inventor came to the conclusion that the usually undesired scattering effect could be used for optical applications by engineering the grating according to the needs so that simplification and miniaturization of optical apparatuses can be realized.

SUMMARY

Therefore, it is an aim to provide a novel apparatus for optical applications using a waveguide as well as a method for producing the same.

According to an embodiment, an apparatus for optical applications comprises an optical waveguide configured to guide light along a light propagation axis and having a first refractive index along the light propagation axis interrupted by a plurality of portions having a second refractive index, wherein each portion has a long axis substantially perpendicular to the light propagation axis as well as a short axis substantially perpendicular to the light propagation axis and the long axis. Further, the apparatus comprises a receiver unit arranged on a side of the optical waveguide. The receiver unit is arranged so as to receive light scattered from the plurality of portions in a scattering direction lying in a main scattering plane defined by the long axis and the light propagation axis. Accordingly, an apparatus may be provided which allows to efficiently couple out light from an optical waveguide and to receive the light at the side of the waveguide at a particular angle with respect to the light propagation axis of the waveguide.

According to another embodiment, an apparatus for optical applications comprises an optical waveguide configured to guide light along a light propagation axis and having a first refractive index along the light propagation axis interrupted by a plurality of portions having a second refractive index, wherein each portion has a long axis substantially perpendicular to the light propagation axis as well as a short axis substantially perpendicular to the light propagation axis and the long axis. Further, the apparatus comprises a transmitter unit arranged on a side of the optical waveguide. The transmitter unit is arranged so as to transmit light to the plurality of portions in a scattering direction lying in a main scattering plane defined by the long axis and the light propagation axis, wherein the scattering direction has a scattering angle with respect to the light propagation axis. Accordingly, an apparatus may be provided which allows to efficiently couple light in an optical waveguide by sending the light onto the waveguide, in particular onto the segment including the plurality of portions having the second refractive index, at a particular angle with respect to the light propagation axis of the waveguide.

According to an advantageous example, the receiver unit of the apparatus may be a detector comprising detector elements arranged in a line for detecting the light scattered from the plurality of portions in the scattering direction. In particular, light of different wavelengths may have different scattering directions and thus different angles with respect to the light propagation axis of the waveguide so that different detector elements detect different wavelengths of light. Therefore, dependent on the detector element detecting light, a wavelength can be determined.

According to another advantageous example, the line of the detector elements is substantially parallel to the light propagation axis and lies in the main scattering plane. Accordingly, light scattered from the plurality of scattering portions of the optical waveguide can be detected with high efficiency outside of the optical waveguide.

According to another advantageous example, the plurality of portions forms a diffraction grating in the direction of the light propagation axis. In one example, the distances between the portions are selected so that in the main scattering plane a lens function is obtained by interference of the light scattered at the plurality of portions. In an alternative or additional example, the light propagation axis of the waveguide is bent so that in the main scattering plane a lens function is obtained by interference of the light scattered at the plurality of portions arranged along the bent light propagation axis. Accordingly, the segment having the plurality of portions forming a grating is not limited to periodically arranged portions but the distances between the portions can be chosen and engineered in such a way that scattering or diffraction on the portions leads to interference effects which correspond to optical lens functions.

In one example, the lens function corresponds to a focusing lens focusing light scattering at the plurality of portions onto the receiver unit or focusing light from the transmitter unit into the optical waveguide by scattering at the plurality of portions. Accordingly, additional optics or optics external to the waveguide can be dispensed with so at to simply the apparatus for optical applications, such as spectrometry.

According to another advantageous example, each portion of the optical waveguide having the second refractive index has a shape approximating an ellipsoid, wherein the long axis of the ellipsoid is larger than twice the wavelength of the light guided in the optical waveguide and the short axis of the ellipsoid is in the order of or smaller than the wavelength of the light. Accordingly, much more light is scattered in a main scattering plane defined by the long axis and the light propagation axis than in a minor scattering plane defined by the short axis and the light propagation axis increasing the efficiency when light is detected in the main scattering plane, for example.

According to another advantageous example, the optical waveguide further comprises an optical Bragg grating along the light propagation axis so as to provide diffracted light. Accordingly, a (normal) Bragg grating may be included in the waveguide which provides the diffracted reference light, for example, light of a particular wavelength back-reflected in the direction of the light propagation axis.

According to another advantageous example, the plurality of portions are adapted so that the scattering direction in the main scattering plane for light propagating in one propagation direction of the light propagation axis is different to another scattering direction in the main scattering plane for light propagating in the opposite direction of the propagation direction. Accordingly, light of different, e.g. opposing, propagation directions is coupled out in different scattering directions so that it is simple to separate light from different propagation directions spatially outside the waveguide.

According to another embodiment, a spectrometer system is provided comprising a light source and the above-mentioned apparatus, wherein the light of the light source is coupled into the optical waveguide at an input port at the front face of the waveguide so as to guide the light along the light propagation axis. Accordingly, a spectrometer having a small size can be realized.

According to another advantageous example, the spectrometer system comprises an optical Bragg grating sensor coupled to an output port of the optical waveguide so as to receive light propagating along the light propagation axis. Accordingly, light affected by the Bragg grating sensor can be easily analyzed with a simple and small spectrometer system.

According to another advantageous example, the optical waveguide comprises at least two light propagation axes being substantially parallel to each other. Accordingly, light coupled in the optical waveguide can be analyzed or processed differently depending on its light propagation axis.

According to another advantageous example, the spectrometer system comprises at least two of the above-mentioned apparatuses arranged one after the other in the direction of the light propagation axis. Accordingly, light coupled in the optical waveguide can be analyzed or processed sequentially when propagating through the optical waveguide and passing the first and subsequently the second apparatus.

According to another embodiment, a method for producing an apparatus for optical applications comprises the step of providing an optical waveguide configured to guide light along a light propagation axis and having a first refractive index along the light propagation axis. The method further comprises the step of focusing short laser pulses on the light propagation axis to produce a plurality of portions having a second refractive index so that each portion has a long axis substantially perpendicular to the light propagation axis and a short axis substantially perpendicular to the light propagation axis and the long axis. Additionally, the method comprises the step of arranging a receiver unit on a side of the optical waveguide so as to enable the reception of light from the plurality of portions in a scattering direction lying in a main scattering plane defined by the long axis and the light propagation axis. Alternatively, the method comprises the step of arranging a transmitter unit on a side of the optical waveguide so as to enable the transmission of light to the plurality of portions in a scattering direction lying in a main scattering plane defined by the long axis and the light propagation axis. Accordingly, an apparatus is produced which allows to efficiently couple out/in light from/to an optical waveguide and to receive/transmit the light at/from the side of the waveguide at a particular angle with respect to the light propagation axis of the optical waveguide.

Further advantageous features of the invention are disclosed in the claims.

DETAILED DESCRIPTION OF THE PREFERRED EMBODIMENTS

Preferred embodiments are described with reference to the figures. It is noted that the following description contains examples only and should not be construed as limiting the invention.

In the following, similar or same reference signs indicate similar or same elements or operations.

Embodiments generally relate to an apparatus for optical applications, such as spectroscopy or optical interrogation methods, comprising an optical waveguide configured to guide light along a light propagation axis and having a first refractive index along the light propagation axis interrupted by a plurality of scattering portions having a second refractive index distributed over a segment of the optical waveguide. Each scattering portion has a long axis substantially perpendicular to the light propagation axis as well as a short axis substantially perpendicular to the light propagation axis and the long axis. A receiver unit or a transmitter unit is arranged on a side of the optical waveguide, the long axis being substantially perpendicular, i.e. normal to the plane of this side on which the receiver unit or transmitter unit is arranged.

The receiver unit is arranged so as to receive light scattered from the plurality of portions in a scattering direction lying in a main scattering plane defined by the long axis and the light propagation axis. In the alternative transmitter case, the transmitter unit is arranged so as to transmit light to the plurality of portions in a scattering direction lying in a main scattering plane defined by the long axis and the light propagation axis.

That is, in the embodiments, a grating like structure having refractive index altered portions is introduced in a segment of a waveguide. The portions are arranged one after the other having a material with another refractive index in between so that light is scattered due to the refractive index differences between the refractive index of the portions and of the light guiding structure in the optical waveguide, wherein the scattered light interferes constructively at certain angles with respect to the light propagation axis of the optical waveguide. Thus, light can be coupled out of the waveguide at the scattering portions and similarly coupled into the waveguide at these portions.

Figure 1A:
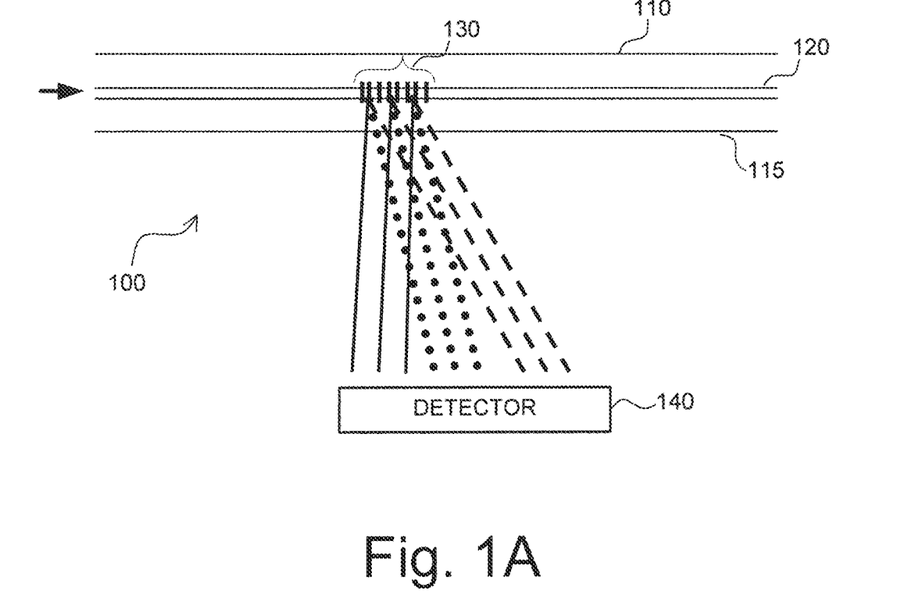
FIG. 1A illustrates elements of an apparatus for optical applications according to an embodiment of the invention.

FIG. 1A illustrates elements of an apparatus 100 according to an embodiment of the invention, comprising an optical waveguide, e.g. made of a first layer 110, a second layer 120 and a third layer 115, as well as a receiver unit 140, e.g. a detector. The receiver unit 140 it not limited to a detector but in other examples a receiver unit 140 may be another plurality of portions in another or even same waveguide receiving the light and guiding it further.

Several examples of optical waveguides are known, e.g. optical fibers, such as glass fibers, polymer fibers, or a bulk-glass substrate with waveguides, polymers with waveguide structures, etc., and the invention is not limited to a particular waveguide. For example, an optical waveguide may be a dielectric slap waveguide having three dielectric layers with different refractive indices, wherein the refractive indices are chosen so as to guide light in the second (middle) dielectric layer. A common example which will be referred to in the following purely as an illustrative example is an optical fiber in which the layer 120 is regarded as the core surrounded by the cladding layer 110, 115. Thus, in the example of the substantially cylindrical optical fiber, layers 110 and 115 are the same belonging to the same cladding. A preferred embodiment of a fiber as an exemplary optical waveguide will be discussed in more detail later with respect to FIG. 2.

The optical waveguide 110, 115, 120 in FIG. 1A, which will be considered to constitute an optical fiber to simplify the discussion in the following, is configured to guide light along a light propagation axis which may be achieved by a core 120 having a first refractive index and a cladding 110 (same as 115) having a different refractive index and coaxially surrounding the core. The core 120 usually guides the largest parts of the light intensity so that the center of the core of the optical fiber may thus be considered to basically determine the direction of the light propagation axis.

In the apparatus 100, the core 120 is interrupted several times by a plurality of portions having a second refractive index different from the first refractive index so that light diffracts/scatters at the portions. The portions 130 may be arranged periodically having all the same distances from each other or the distances between the portions may vary, for example, to achieve a specific optical function of the light scattered from the portions and interfering constructively. When the term light is mentioned herein, light is not limited to visible light but the herein described technology is also applicable to ultraviolet (UV) and infrared (IR) light.

A scattering portion 130 has a long axis substantially perpendicular to the light propagation axis as well as a short axis substantially perpendicular to the light propagation axis and the long axis. For example, the scattering portion 130 may have the shape of an ellipsoid. These differences in the dimensions of the long and short axes of a scattering portion lead to large differences in the intensity of the scattered light. That is, more light is emitted from the waveguide in the scattering direction lying in a main scattering plane defined by the long axis and the light propagation axis than in a scattering direction lying in a minor scattering plane defined by the short axis and the light propagation axis.

For example, to effect strong scattering/diffraction from the optical waveguide in a main scattering plane in FIG. 1A, the long axis may be larger than twice the wavelength of the light guided in the optical waveguide and the short axis may be in the order of or smaller than the wavelength of the light. Preferably, the distances between the portions and the dimensions of the portions are selected so that most light is emitted in the light scattering direction in main scattering plane having an angle between 30 and 150 degrees from the light propagation axis. For example, the light scattering direction may overlap with a diffraction order, preferably the first diffraction order.

In FIG. 1A, the apparatus 100 comprises a receiver unit 140 realized as a detector in this example. This detector detects light scattered from the scattering portions 130. To detect the scattered light, the receiver unit is arranged on a side of the optical waveguide so that it receives the most of the scattered light, namely on a side in the main scattering plane. The long axis being substantially perpendicular, i.e. normal, to the plane of the side on which the receiver unit is arranged.

As can be seen in FIG. 1A, three different light scattering directions in the main scattering plane (here the plane of the paper sheet) are shown for different wavelengths; the dashed line representing blue light, the dotted line representing green light and the solid line representing red light.

In one embodiment, the detector 140 of the apparatus 100 comprises detector elements arranged in a line for detecting the light scattered from the plurality of portions in the scattering direction(s). Detector elements are indicated on detector 340 of FIG. 3 which will be discussed later. For example, in FIG. 1A, detector elements on the right side of the detector in FIG. 1A may detect the blue light, detector elements in the middle may detect green light and detector elements on the left side may detect red light. Examples of a detector having detector elements are a CCD chip, linear diode array, or similar.

In the example of FIG. 1A, the line of the detector elements is substantially parallel to the light propagation axis and lies in the main scattering plane. In particular, the detector 140 is positioned on the right side from the fiber core if a light propagating direction is considered from the left to right side of the paper.

It should be understood that the detector may be as well placed on the left side from the fiber core (when seen in the light propagation direction indicated by the arrow) in the same plane. However, although the light scattered and diffracted from portions 130 is emitted in a symmetrical cone shape where the symmetry axis of the cone is the fiber core, positioning the detector above or below (the paper plane) may be disadvantageous, since then only light scattered in a minor scattering plane defined by the short axis and the light propagation axis can be received.

Figure 1B:
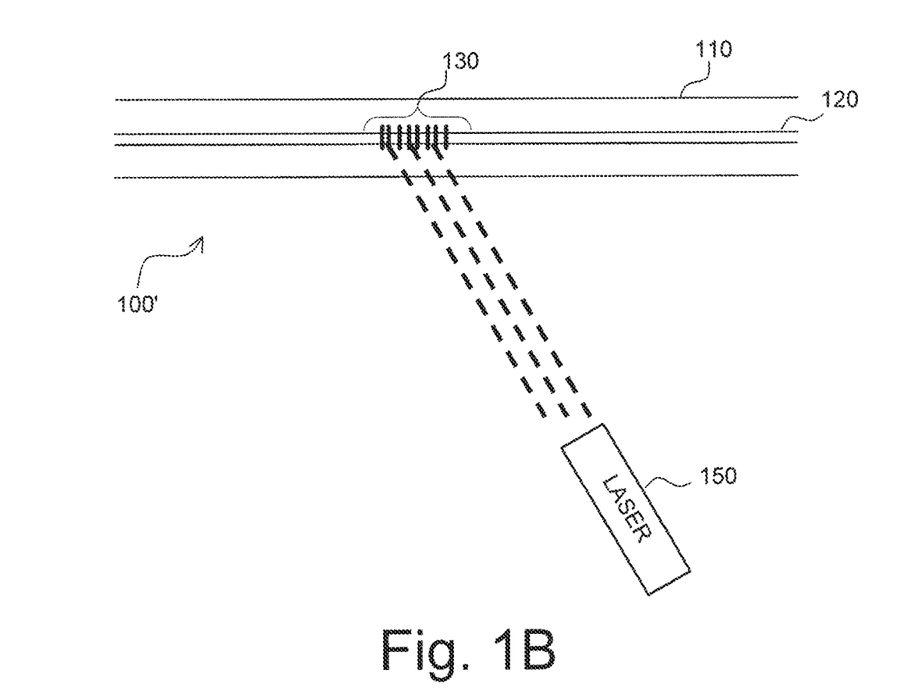
FIG. 1B illustrates elements of an apparatus for optical applications according to another embodiment of the invention.

In FIG. 1B, apparatus 100' is illustrated which comprises the same optical waveguide as apparatus 100 but with the difference that receiver unit 140 is replaced by transmitter unit 150. As explained above, the optical waveguide 110, 120 may be an optical fiber having a fiber core 120 and the cladding 110. The portions 130 again scatter and diffract light but in FIG. 1B, the light is coupled into the core 120 of the optical fiber, since it comes from the transmitter unit outside the waveguide. A single wavelength is illustrated by a dashed line emitted by a laser which is an example of a transmitter unit 150.

The transmitter unit 150 is also arranged on a side of the optical waveguide. In particular, the transmitter unit 150 is arranged so as to transmit light from the outside of the optical waveguide to the plurality of portions in a scattering direction lying in the main scattering plane defined by the long axis and the light propagation axis. As can be seen in FIG. 1B, the scattering direction has a scattering angle of approximately 60° with respect to the light propagation axis.

In the apparatuses 100 and 100' light scatters locally on the refractive index alterations introduced by the scattering portions. According to geometrical optics, the superposition of spherical waves generated by the scattering portions may lead to the observed directional and wavelengths-dependent constructive interferences in certain angles with respect to the light propagation direction (see FIG. 11). By manipulating the distances between the portions basically corresponding to the "lines" of a grating, the optical characteristics of the interferences can be engineered.

The portions 130 act similarly to lines of a grating, however, the portions are not lines but preferably elliptical structures, such as an ellipsoid which leads to more predominant scattering in the plane of the long axis of the ellipsoid and the light propagation axis. For different polarization states a change in intensity of the stray light may be observed whereas for spherical portions scattering appears polarization independent. Interestingly, the above-mentioned effects can be used for coupling in or coupling out light in a particular scattering direction, as shown in FIGS. 1A and 1B.

Figure 2:
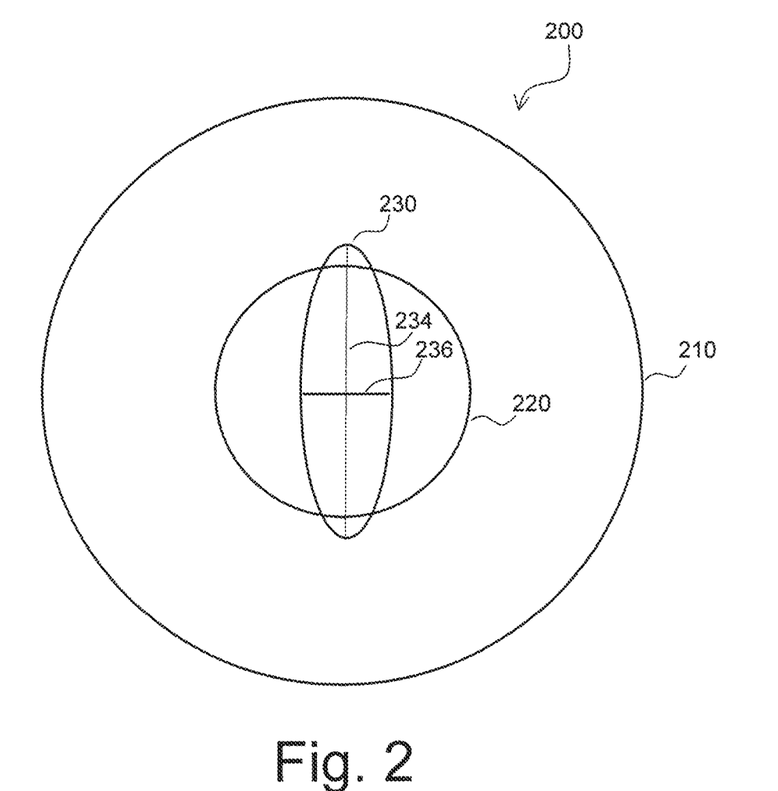
FIG. 2 illustrates in a cross-sectional view an exemplary waveguide usable for the apparatuses of FIGS. 1A and 1B.

FIG. 2 illustrates a cross-sectional view of an exemplary waveguide 200 comprising a core 220 and a cladding 210. As explained above, in the light propagation direction, the core having a first refractive index, such as 1.460 is interrupted by portions having a second refractive index, such as 1.462. The cross-section shown in FIG. 2 shows a portion 230 interrupting the core, i.e. placed in the core so that light propagating to the core experiences a refractive index change, in particular a larger effect is experienced in the long axis corresponding to the vertical axis in the figure than in the short axis corresponding to the horizontal axis in the figure.

In FIG. 2, the portion 230 that is one of the plurality of portions has a shape approximating an ellipsoid in three dimensions (an ellipse is illustrated in two-dimensional FIG. 2), wherein the long axis of the ellipsoid is preferably larger than twice the wavelength of the light guided in the optical waveguide and the short axis of the ellipsoid is in the order of (i.e. 1×wavelength+/−0.5×wavelengths) or smaller than the wavelength of the light. According to one preferred example, the long axis may be three times the wavelength or larger and the short axis may be 1.5 times the wavelength or smaller.

Figure 3:
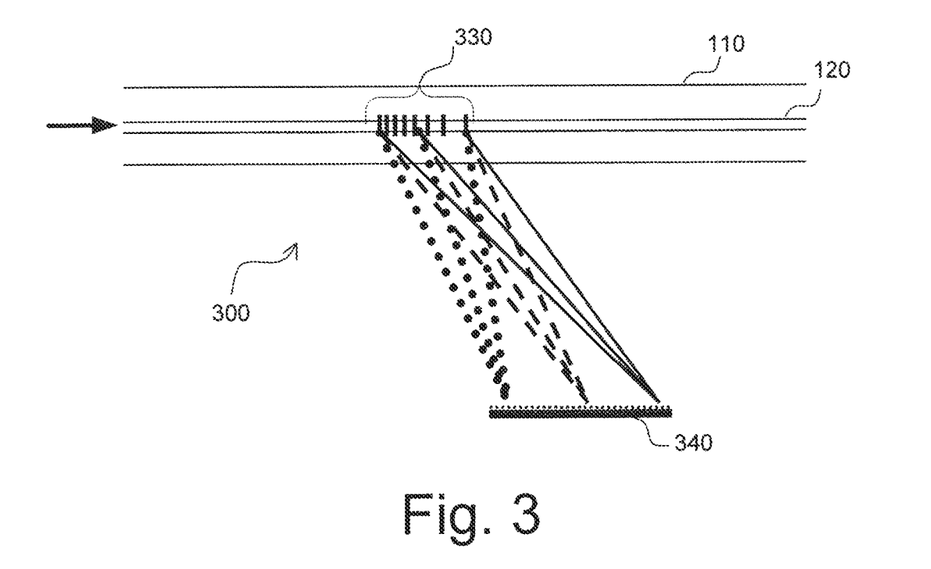
FIG. 3 illustrates elements of a specific apparatus having an optical focusing function according to another embodiment of the invention.

In FIG. 3, apparatus 300 is illustrated which comprises basically the same optical waveguide as apparatuses 100 and 100' but the segment of the waveguide including the plurality of portions has been specifically engineered to incorporate an optical function. In more detail, the distances between the portions are selected in such a way that light entering the waveguide on the left side indicated by the arrow and propagating along the light propagation axis is scattered at the scattering portions so that the light of a specific wavelength is focused on a particular point on the side of the waveguide, preferably on a detector, such as detector 340.

Since different wavelengths are scattered differently and have different scattering directions (and scattering angles) in which they interfere constructively, different wavelengths can be focused on different parts of the detector 340. In particular, the solid line representing blue light focuses on the right side of the detector, the dashed line representing green light focuses on the middle of the detector and the dotted line representing red light focuses on the left side of the detector.

In the example of FIG. 3, the plurality of portions forms a diffraction grating in the core 120 of the waveguide in the direction of the light propagation axis. In particular, in this embodiment, the grating also acts as imaging optics by focusing light. Surely, the optical function coded into the plurality of portions by a particular selection of the distances is not limited to a focusing lens function.

In other words, the distances between the portions are selected so that in the main scattering plane a lens function is obtained by interference of the light scattered at the plurality of portions 330, wherein in one example the lens function corresponds to a focusing lens focusing light scattering at the plurality of portions. Accordingly, direct imaging of light on a detector is possible, since an aspheric imaging function can be integrated in the waveguide by specific distances between the grating portions.

Instead of selecting specific distances between the portions when manufacturing the waveguide as in FIG. 3, a similar effect may be achieved by bending an optical fiber having scattering portions arranged periodically. This basically corresponds to bending the light propagation axis so that in the main scattering plane a lens function is obtained by interference of the light scattered at the plurality of portions arranged along the bent light propagation axis. An example of providing the optical function of a focusing lens is provided in FIG. 4.

Figure 4:
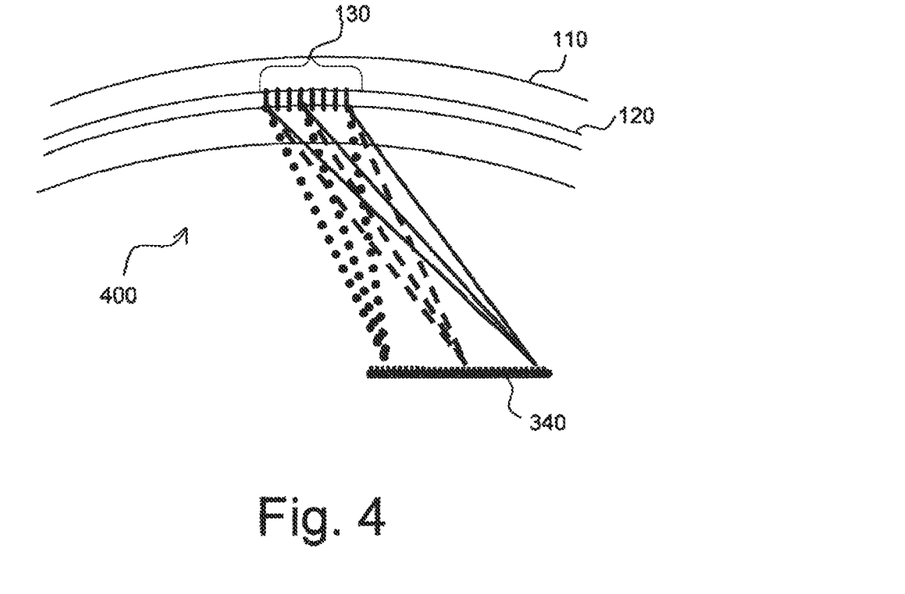
FIG. 4 illustrates elements of a specific apparatus having an optical focusing function by bending a waveguide according to another embodiment of the invention.

In FIG. 4, apparatus 400 comprises a bend waveguide, wherein the curvature leads to constructive interference in the same way as in FIG. 3 so as to obtain an effect of focusing different wavelengths on a detector.

In one embodiment, the apparatuses 300 and 400 may be used as a spectrometer in which a special slit, grating or imaging optics are not needed, since the waveguide and its light guiding section act as slit and the plurality of scattering portions acts as diffraction grating which largely simplifies the structure of the spectrometer.

According to one embodiment, a spectrometer system comprising a light source and one of the above mentioned apparatuses 100, 100', 300 or 400 is provided, wherein the light of the light source is coupled into the optical waveguide at an input port so as to guide the light along the light propagation axis. The light source may be preferably a light source with a broad wavelength range, such as a super luminescent diode (S-LED) or white light from a halogen or tungsten lamp.

As a result of the above, to obtain a spectrometer merely two parts have to be manufactured and arranged with respect to each other, namely the above-mentioned waveguide and a detector. More importantly, focus length, size of the spectrometer and the wavelength range to be analyzed are freely selectable leading to much simpler and smaller spectrometers than in the prior art that require complicated focusing optics and expensive line gratings.

Since the positional relationship between the focusing optics and the line grating in the prior art is crucial, the here proposed spectrometer in which the focusing optics is integrated in the grating is more rigid and misalignment can hardly occur. Due to the possibility of a large spectral separation of wavelengths and integration of optics in the waveguide, the herein described spectrometer can be more than five times smaller than existing spectrometers having the same properties but optics arranged in free space. Further, the herein described spectrometer may have a large number of portions (more than 10000) along the light propagation axis so that the spectral resolution can be easily increased.

Figure 5:
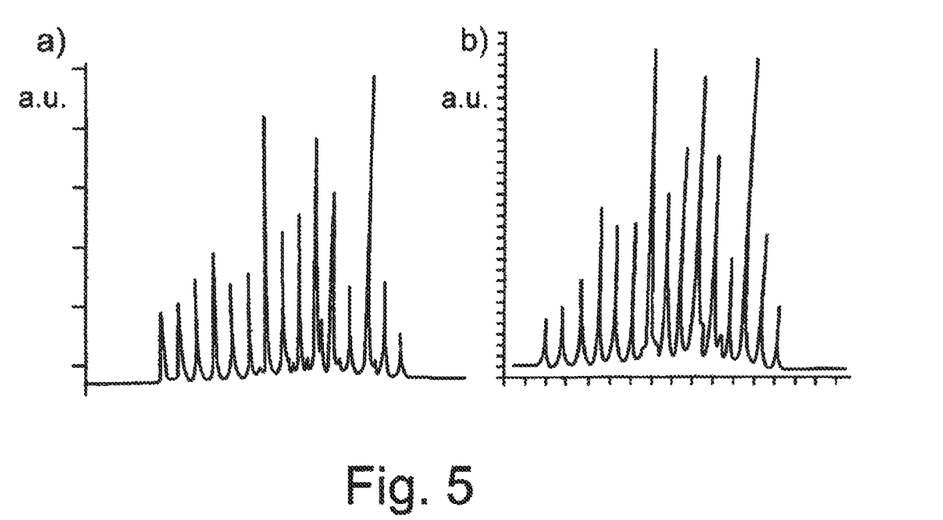
FIG. 5 illustrates qualitatively the performance of a spectrometer according to one embodiment and a spectrometer of the prior art.

FIG. 5 illustrates qualitatively the performance of a spectrometer according to one embodiment (b) and a spectrometer of the prior art (a). To compare spectra from a conventional spectrometer with a spectrometer according to the inventive concept, a 2×2 fiber coupler has been used, wherein the upper input port of the coupler was connected to an S-LED and the upper output port to an FBG sensor fiber producing 15 peaks. The back reflected signal of the sensor was then measured at the lower output port of the fiber coupler in (a) with an OCEAN-Optics Flame spectrometer which was replaced in (b) by the apparatus 300 having as a detector a commercial WebCam module at 2 cm focal length and standard drivers of MS Windows.

The spectra in FIG. 5 show arbitrary units on the Y axis and wavelength on the X axis. It can be seen that qualitatively the ability of separating wavelengths is basically the same for the expensive prior art spectrometer resulting in the spectrum a) on the left side of FIG. 5 and for the low-cost spectrometer of the embodiment resulting in the spectrum b) on the right side.

One of the problems in a known interrogator system having a spectrometer based Bragg grating is that such a system requires at least one optical circulator or coupler to direct the light reflected back from a FBG sensor to a detector. For systems having a low light level, e.g. when analyzing an FBG in a fiber using an LED, intensity losses of the light source coupled to a fiber and passing a 2×2 coupler are large and thus reduction thereof is important. Further, costs are large because a coupling element is needed which further contributes to the size of the system. An apparatus having a waveguide and a plurality of specially arranged portions, as described above, may mitigate some of these problems.

Figure 6:
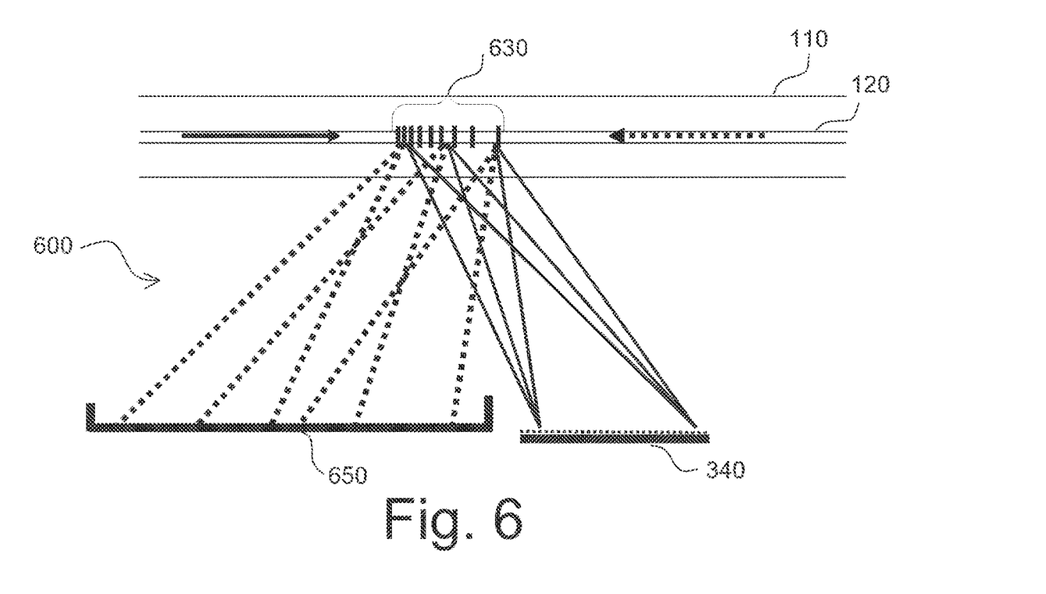
FIG. 6 illustrates elements of a specific apparatus having an optical focusing function for light in one propagation direction.

FIG. 6 illustrates elements of a specific apparatus 600 having an optical focusing function for light in one propagation direction (see solid line) realized by scattering portions 630 similar to apparatus 300 of FIG. 3 and having diffuse scattering in the other direction (see dashed line). The diffuse scattered light can then be trapped by a light trap 650. That is, the angles of the light scattering directions are largely different for the two propagation directions in FIG. 6 so that the scattered light can be detected in largely different spatial directions and positions.

In this embodiment, the plurality of portions are adapted so that the scattering direction in the main scattering plane for light propagating in one propagation direction of the light propagation axis is different to another scattering direction in the main scattering plane for light propagating in the opposite direction of the propagation direction. Since the scattering directions are different, light of one propagation direction falls on the detector 340 in a focused fashion and the light of the opposite propagation direction will not. In essence, by modification of the grating period, symmetry is broken and the above-mentioned effect can be achieved.

Figure 9:
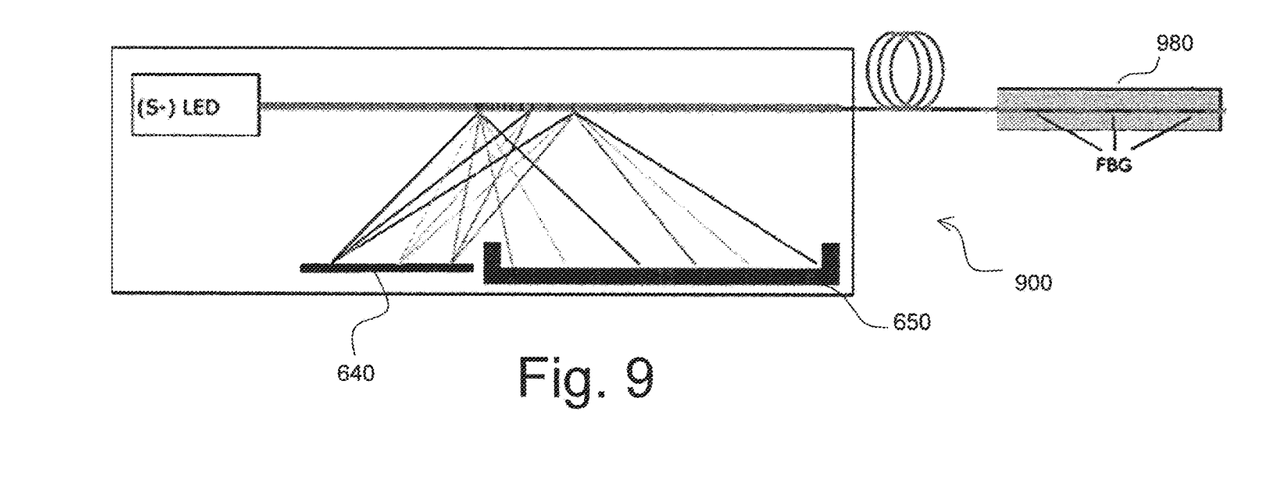
FIG. 9 illustrates a spectrometer system according to an embodiment.
Figure 10:
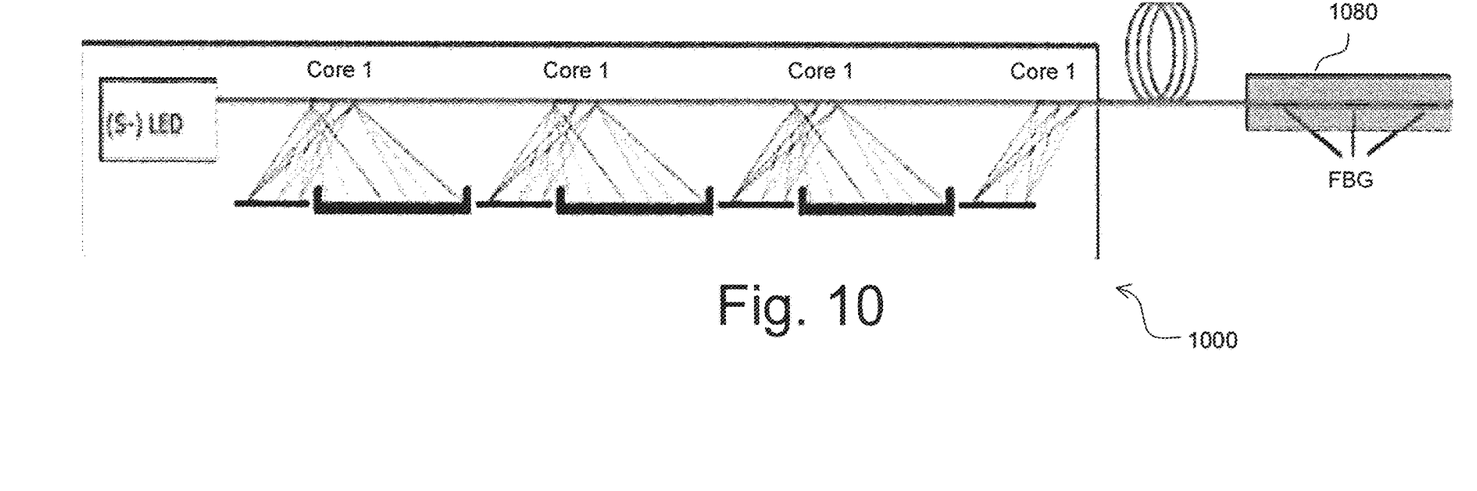
FIG. 10 illustrates a multicore interrogator system according to another embodiment.

Furthermore, a part of the light in the waveguide scatters at the grating according to the efficiency of the grating and another part which can be determined by the process parameters is simply transmitted to reach an FBG sensor where it is reflected (see e.g. FIGS. 9 and 10). The reflected light can then be focused on the detector 340 on the way back.

For example, by using the above mentioned diffraction grating with an imaging function incorporated in a waveguide, a known interrogator system having a spectrometer based Bragg grating can be greatly simplified. Accordingly, a more cost efficient and smaller interrogator system can be realized which requires merely a light source, an optical waveguide and a detector, such as a camera, linear diode array or individual photodiodes. Most of the functions can be realized in the waveguide, e.g. fiber, so that there is not much space needed for other optics or fiber windings. Such an interrogator can thus be directly integrated in measurement devices which have limited space.

Figure 7:
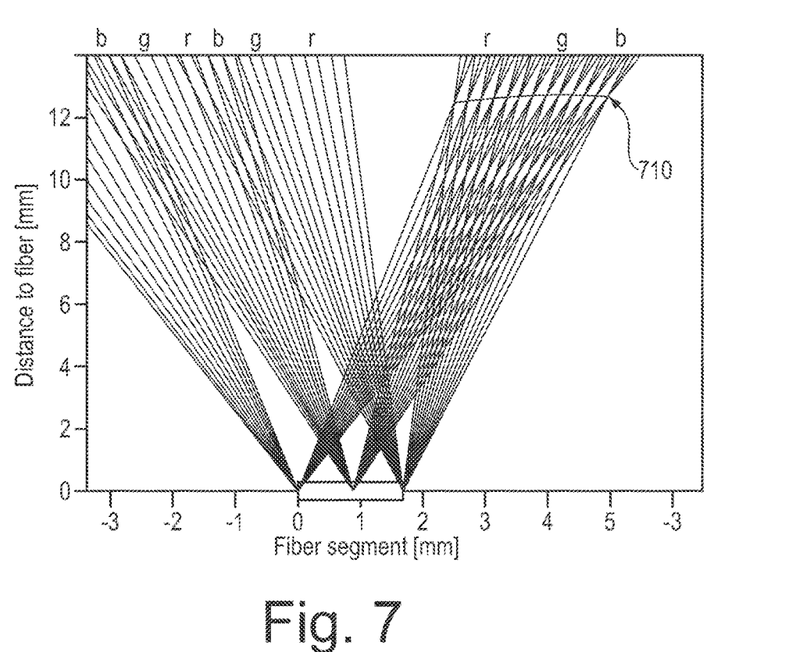
FIG. 7 illustrates the effects of the apparatus of FIG. 6 qualitatively for different wavelengths.

FIG. 7 illustrates the effects of the apparatus 600 of FIG. 6 qualitatively for different wavelengths. In the first direction from left to right, it is simulated how red (r), green (g) and blue (b) light is scattered at portions in a fiber segment and focused on the line 710. In the opposite direction from the right to left, the simulation in FIG. 7 shows that there is no focusing effect and light is scattered in a completely different direction from the light in the first direction.

FIG. 9 illustrates a spectrometer system 900 according to an embodiment. The spectrometer system 900 is basically an interrogator system and comprises the apparatus 600 including a detector 640 and a light trap 650 for diffusively scattered light. The spectrometer system 900 comprises an optical Bragg grating acting as a sensor sensing physical parameters, such as temperature, at an object 980. The optical Bragg grating sensor is coupled to an output port of the optical waveguide so as to receive light propagating along the light propagation axis. Alternatively, the optical Bragg grating sensor is integrally incorporated in the optical waveguide or fiber of apparatus 600.

In operation, light from the light source, e.g. S-LED, propagating from left to right is scattered at the plurality of portions and the scattered light is received in the light trap 650. The unscattered part of the light is further transmitted to the fiber Bragg grating at the object to be measured and then back reflected at the FBG and scattered again at the plurality of portions, wherein in the direction from right to left the scattered light is now focused on the detector 640. Thus, the system 900 comprises merely three elements and has a much higher light efficiency than a system with an optical circulator or coupler.

Another application of the inventive concept is to multi-core fibers. Conventionally, when using multicore fibers, if the propagating light needs to be analyzed, each core of the multicore fiber needs to be coupled to individual single-core fibers. To do this, a so-called fan-out device is known which is complicated to manufacture and expensive as well as difficult to align. When using the above principle to output/input light propagating in a fiber by a plurality of scattering portions, it is not necessary to couple individual fibers to the multicore fiber.

Figure 8:
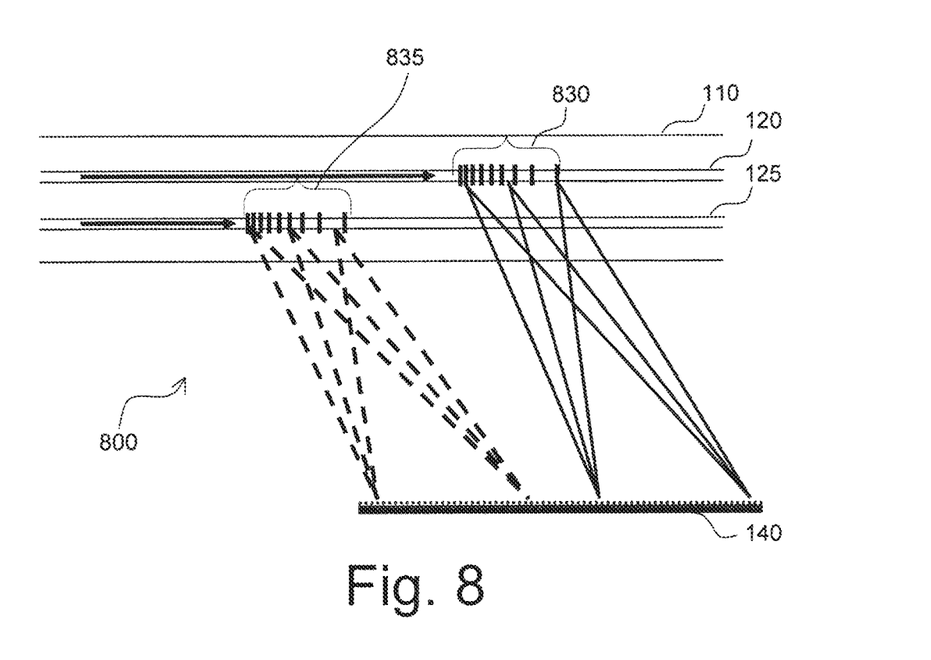
FIG. 8 illustrates elements of a specific apparatus having two light propagation axes.

FIG. 8 illustrates elements of a specific apparatus 800 having two light propagation axes. In particular, light propagates in a first core 120 parallel to a second core 125 in the same waveguide. In both cores a plurality of scattering portions 830 and 835, respectively, are provided which focus light on detector 140. In essence, two apparatuses 300 or 600 are used.

FIG. 10 illustrates a multicore interrogator system 1000 according to another embodiment. In this embodiment, the optical waveguide comprises at least two light propagation axes being substantially parallel to each other, e.g. at least two fiber cores in a multicore fiber. The light of the different light propagation axes of the different cores can then be analyzed core by core by outputting the light on a long detector or several detectors, as indicated in FIG. 10.

In more detail, the multicore interrogator system 1000 comprises an S-LED as light source and an PBG as sensor at an object 1080. Further, it comprises four cores, namely core1, core 2, core3 and core4. Each core and its associated detector and light trap constitutes basically an apparatus 600. Accordingly, a multicore interrogator system can be realized without using a coupling element or additional opto-mechanic components.

Further, spectrometer based FBG interrogator systems often show a temperature-dependent signal drift in a warming up phase. When the spectrometer warms up changes in the optical path, for example expansion of optics or grating, may occur so as to change the detected wavelengths. Instead of providing a complicated temperature adjustment method, a bidirectional fiber optic spectrometer, such as the system 900 in FIG. 9, may be provided. That is, a conventional Bragg grating may be added to or incorporated in the fiber optic spectrometer. This Bragg grating may then act as a reference light source for easy temperature compensation.

Still further, by using the above described scattering effects, weakly reflecting and/or homogeneous Bragg gratings of different lengths may be incorporated in a waveguide so that light coupled out from the waveguide can be directly read by a conventional barcode reader, e.g. for identifying the waveguide. If the grating(s) is/are weakly reflecting, there is hardly any effect on the sensor signal. In this way, an unambiguous association of the fiber, e.g. by identifying place and date of manufacture, can be realized.

Figure 11:
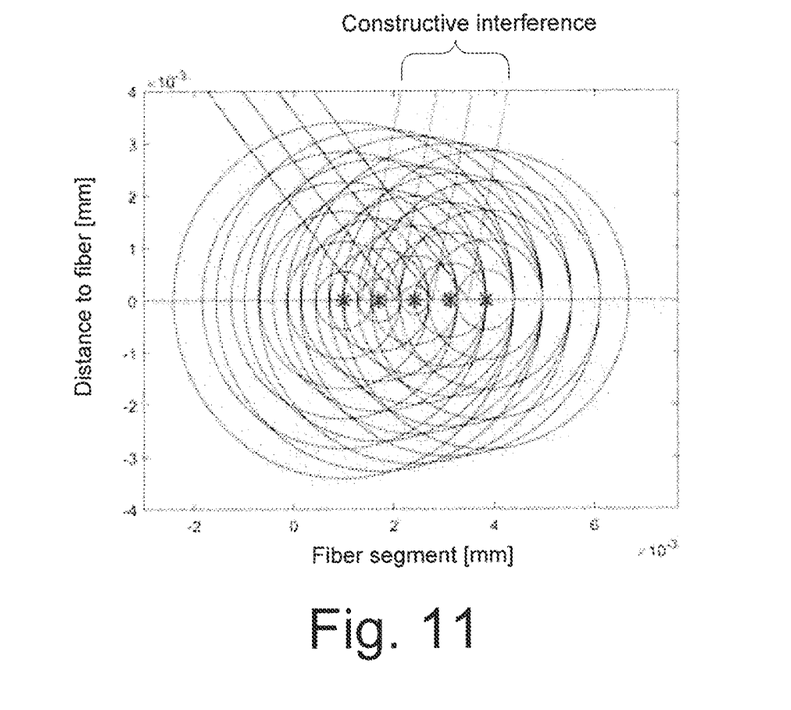
FIG. 11 illustrates a simulation with spherical waves using principles of geometrical optics.

FIG. 11 illustrates a simulation of the scattering effects explained in the above embodiments using spherical waves and the principles of geometrical optics. According to geometrical optics, the superposition of spherical waves generated by the scattering portions, indicated as stars (*) in FIG. 11, may lead to the observed directional and wavelengths-dependent constructive interferences in certain angles with respect to the light propagation axis (the horizontal axis in FIG. 11).

In general, diffractive scattering occurs over the length of the grating and at least one diffraction order having a particular diffraction angle can be observed which can be approximated by the Bragg equation for diffraction. Thus, in a waveguide, such as an optical fiber, which has a cylindrical symmetry, light is emitted in the shape of a cone around the light propagation axis of the fiber as a symmetry axis with an opening angle corresponding to the diffraction angle (approximately 80° in FIG. 11).

For example, the scattering portions forming a grating may be produced like the above-mentioned type II gratings, written by high intensity femtosecond lasers, operating above the damage threshold of glass. For example, a femtosecond laser may be used to write a grating point-by-point with pulse energy of approximately 0.1 µJ or more and pulse duration of 500 fs or shorter.

The scattering and/or diffraction patterns observed on a type II grating may be explained like this. When producing a scattering portion of the grating with a femtosecond laser, this portion is not homogenous and several microscopic structures of different sizes in the scattering portions of the grating lead to different scattering and diffraction effects. Accordingly, the refractive index of a scattering portion may be regarded as an average refractive index resulting from several different microscopic defects resulting from the pulsed laser pulses destroying the homogenous structure of the core of the waveguide.

According to another embodiment, a method for producing an apparatus for optical applications comprises providing an optical waveguide configured to guide light along a light propagation axis and having a first refractive index along the light propagation axis and then focusing short laser pulses on the light propagation axis to produce the plurality of portions having a second refractive index so that each portion has a long axis substantially perpendicular to the light propagation axis and a short axis substantially perpendicular to the light propagation axis and the long axis. Further, the method comprises arranging a receiver unit or transmitter unit on a side of the optical waveguide so as to enable the reception or transmission of light from or to the plurality of portions in a scattering direction lying in a main scattering plane defined by the long axis and the light propagation axis.

As described above, embodiments and examples of the invention allow for coupling in and coupling out light. Therefore, a simple and small light coupling apparatus may be provided.

It will be appreciated that various modifications and variations can be made in the described apparatuses, systems and methods as well as in the construction of this invention without departing from the scope or spirit of the invention.

The invention has been described in relation to particular embodiments and examples which are intended in all aspects to be illustrative rather than restrictive.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features of the foregoing disclosed implementation or configuration. Thus, the true scope and spirit of the invention is indicated by the following claims.

The invention claimed is:

1. An apparatus for optical applications, comprising:
an optical waveguide configured to guide light along a light propagation axis and having a first refractive index along the light propagation axis interrupted by a plurality of portions having a second refractive index, wherein each portion of the plurality of portions has a long axis perpendicular to the light propagation axis and a short axis perpendicular to the light propagation axis and the long axis, the short axis being shorter than the long axis; and
a receiver arranged on a side of the optical waveguide, wherein the receiver is arranged so as to receive light scattered from the plurality of portions, and
wherein the optical waveguide is an optical fiber having a core surrounded by a cladding layer.

2. The apparatus for optical applications according to claim 1, wherein the receiver comprises optical detectors arranged in a line for detecting the light scattered from the plurality of portions, the line of the optical detectors being parallel to the light propagation axis.

3. A spectrometer system, comprising a light source and the apparatus according to claim 2, wherein light of the light source is coupled into the optical waveguide at an input port so as to guide the light along the light propagation axis.

4. The spectrometer system according to claim 3, further comprising an optical Bragg grating sensor coupled to an output port of the optical waveguide so as to receive light propagating along the light propagation axis.

5. The spectrometer system according to claim 3, wherein the optical waveguide comprises at least two light propagation axes being parallel to each other.

6. The spectrometer system according to claim 3, wherein the spectrometer system comprises at least two of the apparatus arranged one after another in a direction of the light propagation axis.

7. The apparatus for optical applications according to claim 1, each portion of the plurality of portions having an ellipsoid shape, wherein a length of the long axis of the ellipsoid is larger than twice a wavelength of the light guided in the optical waveguide and a length of the short axis of the ellipsoid shape is in an order of or smaller than the wavelength of the light.

8. The apparatus for optical applications according to claim 1, wherein each portion of the plurality of portions comprises a plurality of different microscopic defects produced by a laser and the second refractive index of each portion is an average refractive index.

9. The apparatus for optical applications according to claim 1, wherein the optical waveguide further comprises an optical Bragg grating along the light propagation axis so as to provide diffracted light.

10. An apparatus for optical applications, comprising:
an optical waveguide configured to guide light along a light propagation axis and having a first refractive index along the light propagation axis interrupted by a plurality of portions having a second refractive index, wherein each portion of the plurality of portions has a long axis perpendicular to the light propagation axis and a short axis perpendicular to the light propagation axis and the long axis, the short axis being shorter than the long axis; and
a receiver arranged on a side of the optical waveguide, wherein the receiver is arranged so as to receive light scattered from the plurality of portions,
wherein the plurality of portions form a grating in a direction of the light propagation axis, and
wherein distances between the plurality of portions are selected so that a lens function is obtained by interference of light scattered at the plurality of portions, or wherein the light propagation axis is bent so that a lens function is obtained by interference of the light scattered at the plurality of portions arranged along the bent light propagation axis.

11. The apparatus for optical applications according to claim 10, wherein the lens function corresponds to a focusing lens focusing light scattered at the plurality of portions.

12. An apparatus for optical applications, comprising:
an optical waveguide configured to guide light along a light propagation axis and having a first refractive index along the light propagation axis interrupted by a plurality of portions having a second refractive index, wherein each portion has a long axis perpendicular to the light propagation axis and a short axis perpendicular to the light propagation axis and the long axis, the short axis being shorter than the long axis; and
a transmitter arranged on a side of the optical waveguide, wherein the transmitter is arranged so as to transmit light to the plurality of portions,
wherein the plurality of portions form a grating in a direction of the light propagation axis, and
wherein distances between the plurality of portions are selected so that a lens function is obtained by interference of light scattered at the plurality of portions, or wherein the light propagation axis is bent so that a lens function is obtained by interference of the light scattered at the plurality of portions arranged along the bent light propagation axis.

13. The apparatus for optical applications according to claim 12, each portion of the plurality of portions having an ellipsoid shape, wherein a length of the long axis of the ellipsoid is larger than twice a wavelength of the light guided in the optical waveguide and a length of the short axis of the ellipsoid shape is in an order of or smaller than the wavelength of the light.

14. The apparatus for optical applications according to claim 12, wherein each portion of the plurality of portions comprises a plurality of different microscopic defects produced by a laser and the second refractive index of each portion is an average refractive index.

15. A method for producing an apparatus for optical applications, comprising:
providing an optical waveguide configured to guide light along a light propagation axis and having a first refractive index along the light propagation axis;
focusing laser pulses on the light propagation axis to produce a plurality of portions having a second refractive index so that each portion of the plurality of portions has a long axis perpendicular to the light propagation axis and a short axis perpendicular to the light propagation axis and the long axis, the short axis being shorter than the long axis; and
arranging a receiver or transmitter on a side of the optical waveguide so as to enable reception or transmission of light from or to the plurality of portions.

16. The method of claim 15, wherein focusing the laser pulses on the light propagation axis to produce the plurality of portions comprises producing with the laser pulses, for each portion of the plurality of portions, a plurality of different microscopic defects to form the portion with a second refractive index being an average refractive index.

17. The method of claim 15, wherein:
focusing the laser pulses to produce the plurality of portions comprises forming the plurality of portions as a grating in a direction of the light propagation axis, and
the method comprises selecting distances between the plurality of portions so that a lens function is obtained by interference of light scattered at the plurality of portions, or wherein the light propagation axis is bent so that a lens function is obtained by interference of the light scattered at the plurality of portions arranged along the bent light propagation axis.

18. The method of claim 15, wherein providing the optical waveguide comprises providing an optical waveguide with an optical fiber having a core surrounded by a cladding layer.

\* \* \* \* \*